US011052337B2

(12) United States Patent
Yamamoto et al.

(10) Patent No.: US 11,052,337 B2
(45) Date of Patent: Jul. 6, 2021

(54) FILTRATION FILTER AND FILTRATION FILTER DEVICE

(71) Applicant: Murata Manufacturing Co., Ltd., Nagaokakyo (JP)

(72) Inventors: Wataru Yamamoto, Nagaokakyo (JP); Takashi Kondo, Nagaokakyo (JP); Masaru Banju, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 233 days.

(21) Appl. No.: 15/719,911

(22) Filed: Sep. 29, 2017

(65) Prior Publication Data

US 2018/0021709 A1 Jan. 25, 2018

Related U.S. Application Data

(63) Continuation of application No. PCT/JP2017/001588, filed on Jan. 18, 2017.

(30) Foreign Application Priority Data

Feb. 15, 2016 (JP) .............................. JP2016-026175

(51) Int. Cl.
*B01D 39/10* (2006.01)
*B01D 29/05* (2006.01)
*B01D 29/01* (2006.01)
*B01D 35/30* (2006.01)

(52) U.S. Cl.
CPC ........... *B01D 39/10* (2013.01); *B01D 29/012* (2013.01); *B01D 29/05* (2013.01); *B01D 35/30* (2013.01); *B01D 2201/184* (2013.01)

(58) Field of Classification Search
None
See application file for complete search history.

(56) References Cited

U.S. PATENT DOCUMENTS

| 4,812,236 A * | 3/1989 | Ehrsam | B01D 29/012 |
| | | | 210/490 |
| 9,329,125 B2 | 5/2016 | Kondo et al. | |
| 9,452,384 B2 | 9/2016 | Narita et al. | |

(Continued)

FOREIGN PATENT DOCUMENTS

| JP | S63-107705 A | 5/1988 |
| JP | 2006-329108 A | 12/2006 |

(Continued)

OTHER PUBLICATIONS

International Search Report issued in International Application No. PCT/JP2017/001588, dated Mar. 7, 2017.

(Continued)

*Primary Examiner* — Jason M Greene
*Assistant Examiner* — Eric J McCullough
(74) *Attorney, Agent, or Firm* — Arent Fox LLP

(57) ABSTRACT

A filtration filter includes a porous metal film that filters out a filtration object contained in a fluid, and a support base member that is disposed on at least one main surface of the porous metal film and that supports the porous metal film. The support base member has an opening that exposes a part of the porous metal film. An inner peripheral surface of the opening has undulations formed along its periphery.

11 Claims, 5 Drawing Sheets

(56) References Cited

U.S. PATENT DOCUMENTS

| | | | |
|---|---|---|---|
| 2007/0104622 A1* | 5/2007 | Zuberi | B01D 53/944 422/177 |
| 2015/0198527 A1 | 7/2015 | Kondo et al. | |
| 2016/0136572 A1 | 5/2016 | Narita et al. | |
| 2017/0216744 A1 | 8/2017 | Kondo et al. | |

FOREIGN PATENT DOCUMENTS

| | | | |
|---|---|---|---|
| JP | 2011-173054 A | 9/2011 | |
| JP | 2014-151286 A | 8/2014 | |
| JP | 2015-44187 A | 3/2015 | |
| WO | WO 2014/050328 A1 | 4/2014 | |
| WO | WO 2016/140005 A1 | 9/2016 | |
| WO | WO 2016/208362 A1 | 12/2016 | |

OTHER PUBLICATIONS

Written Opinion of the International Searching Authority issued in International Application No. PCT/JP2017/001588, dated Mar. 7, 2017.

* cited by examiner

FILTRATION FILTER AND FILTRATION FILTER DEVICE

CROSS REFERENCE TO RELATED APPLICATIONS

The present application is a continuation of International application No. PCT/JP2017/001588, filed Jan. 18, 2017, which claims priority to Japanese Patent Application No. 2016-026175, filed Feb. 15, 2016, the entire contents of each of which are incorporated herein by reference.

TECHNICAL FIELD

The present invention relates to a filtration filter that filters out a filtration object contained in a fluid and a filtration filter device including the filtration filter.

BACKGROUND OF THE INVENTION

An example of such a filtration filter is described in International Publication No. 2014/050328 (Patent Document 1). The filtration filter described in Patent Document 1 includes a porous metal film, which filters out a filtration object contained in a fluid, and a support base member, which is disposed on at least one main surface of the porous metal film and which supports the porous metal film.

However, exiting filtration filters still have room for improvement in efficiency in filtering a filtration object.

An object of the present invention, which addresses the above problem, is to provide a filtration filter and a filtration filter device that can improve efficiency in filtering a filtration object.

BRIEF DESCRIPTION OF THE INVENTION

In accordance with an embodiment of the invention, a filtration filter includes:

a porous metal film for filtering out a filtration object contained in a fluid; and a support base member disposed on at least one main surface of the porous metal film, the support base member supporting the porous metal film, the support base member having an opening that exposes a part of the porous metal film, an inner peripheral surface of the opening being undulated.

In a preferred embodiment, the undulations are formed at least in a portion of the support base member that is in contact with the porous metal film.

The undulations preferably include ridges and troughs that are alternately arranged and extend in a direction perpendicular to a plane in which the porous metal film lies. In a preferred embodiment, this is the direction in which the fluid passing through the filtration filter flows.

The pitches of the ridges and the troughs are each preferably smaller than an average particle size of the filtration object. The pitches of the ridges and the troughs are each preferably smaller than or equal to a pitch of through-holes that are formed in the porous metal film to filter out the filtration object.

The troughs are preferably located at positions corresponding to though-holes that are formed in the porous metal film to filter out the filtration object.

The invention is also directed towards a filtration filter device including the above filtration filter and a housing in which the filtration filter is disposed. The housing has a fluid inlet path that faces one main surface of the filtration filter and a fluid outlet path that faces the other main surface of the filtration filter.

The invention is further directed towards a method for forming and method for using the above filtration filter.

With the present invention, it is possible to provide a filtration filter that can improve efficiency in filtering a filtration object and a filtration filter device including the filtration filter.

DESCRIPTION OF EMBODIMENTS

Figure 1:
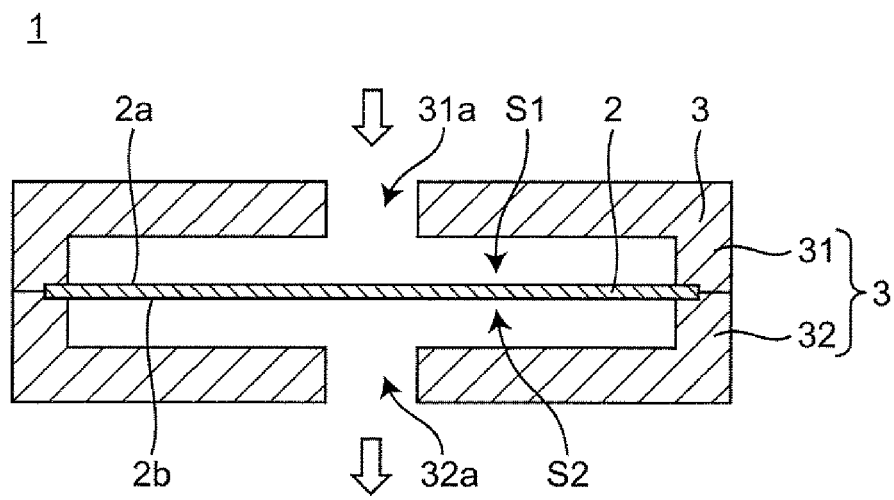
FIG. 1 is a schematic sectional view of a filtration filter device according to an embodiment of the present invention.

Findings that Form the Basis of the Present Invention

The inventors extensively investigated ways to improve efficiency in filtering a filtration object and obtained the following findings.

Typically, when a fluid including a filtration object passes through a filtration filter, the filtration filter generates resistance and the filtration object tends to accumulate in a region near the filtration filter.

Using the filtration filter described in Patent Document 1, the inventors performed filtration by causing a fluid to pass through the filtration filter from the main surface on which the support base member is disposed. As a result, the inventors found that a filtration object adhered to an inner peripheral surface of an opening of the support base member, the filtration object impeded flow of the fluid, and filtration efficiency decreased. The inventors also found that (1) the filtration object tended to accumulate in a central part of an exposed portion of the porous metal film, which was surrounded by the opening of the support base member, (2) the filtration object that had accumulated in the central part impeded flow of the fluid, and (3) filtration efficiency decreased.

The inventors intensively examined these new findings and found that it is possible to suppress adhesion of a filtration object to the inner peripheral surface of the opening of the support base member by forming undulations in the inner peripheral surface in the peripheral direction. The inventors also found the following: (1) by forming the undulation, a fluid that has been bounced back by the porous metal film collides with the undulation and thereby the fluid flows in diverse directions and (2) due to the diversity of the flow directions, eddy flow or turbulent flow is generated in the opening of the support base member and thereby accumulation of the filtration object in the central part can be suppressed.

Based on these findings, the inventors devised the following invention.

A filtration filter according to an aspect of the present invention includes a porous metal film that filters out a filtration object contained in a fluid and a support base member that is disposed on at least one main surface of the porous metal film and that supports the porous metal film. The support base member has an opening that exposes a part of the porous metal film, and an inner peripheral surface of the opening has undulation in a peripheral direction.

With this structure, because the inner peripheral surface of the opening in the peripheral direction has the undulation, it is possible to suppress adhesion of the filtration object to the inner peripheral surface of the opening and to suppress accumulation of the filtration object in a central part of the exposed portion of the porous metal film. Accordingly, filtration efficiency can be improved.

Preferably, at least a portion that is in contact with the porous metal film has the undulation. With this structure, it is possible to more effectively suppress adhesion of the filtration object and to improve filtration efficiency.

Preferably, the undulation includes ridges and troughs that are alternately arranged, and the ridges and the troughs extend in a direction in which the fluid flows. With this structure, it is possible to reduce pressure loss due to the ridges and the troughs and to improve filtration efficiency.

Preferably, pitches of the ridges and the troughs are each smaller than an average particle size of the filtration object. With this structure, it is possible to suppress entry of the filtration object into the troughs and to reduce the contact area between the filtration object and the inner peripheral surface. As a result, it is possible to further suppress adhesion of the filtration object to the inner peripheral surface.

Preferably, pitches of the ridges and the troughs are each smaller than or equal to a pitch of through-holes that are formed in the porous metal film to filter out the filtration object. The pitch of the through-holes in the porous metal film is set smaller than the average particle size of the filtration object in order to filter out the filtration object. Accordingly, with this structure, it is possible to further reliably suppress entry of the filtration object into the troughs and to further suppress adhesion of the filtration object to the inner peripheral surface.

Preferably, the troughs are located at positions corresponding to though-holes that are formed in the porous metal film to filter out the filtration object. With this structure, compared with a case where the ridges are located at positions corresponding to the through-holes, it is possible to increase the opening area of the porous metal film and to improve filtration efficiency.

A filtration filter device according to an aspect of the present invention includes any one of the filtration filters described above; and a housing in which the filtration filter is disposed, the housing having a fluid inlet path that faces one main surface of the filtration filter and a fluid outlet path that faces the other main surface of the filtration filter.

With this structure, because the filtration filter device includes one of the filtration filters described above, it is possible to improve the filtration efficiency of the filtration filter device.

Hereafter, an embodiment of the present invention will be described with reference to the drawings.

Embodiment

The structure of a filtration filter device according to an embodiment will be described. FIG. 1 is a schematic sectional view illustrating a filtration filter device according to an embodiment of the present invention.

As illustrated in FIG. 1, a filtration filter device 1 according to the present embodiment includes a filtration filter 2 and a housing 3 in which the filtration filter 2 is disposed. The housing 3 includes a first housing portion 31 and a second housing portion 32. The first housing portion 31 and the second housing portion 32 cooperate to hold an outer peripheral portion of the filtration filter 2 therebetween by, for example, being fitted together. The first housing portion 31 includes a fluid inlet path 31a that faces one main surface 2a of the filtration filter 2. A portion S1 of the fluid inlet path 31a facing the one main surface 2a of the filtration filter 2 is enlarged so that fluid can be supplied to the entirety of the filtration filter 2 excluding the outer peripheral portion. The second housing portion 32 includes a fluid outlet path 32a that faces the other main surface 2b of the filtration filter 2. A portion S2 of the fluid outlet path 32a facing the other main surface 2b of the filtration filter 2 is enlarged so that a fluid that has passed through the filtration filter 2 excluding the outer peripheral portion can be discharged.

A fluid containing a filtration object is supplied to the filtration filter 2 through the fluid inlet path 31a, the filtration object is filtered out by the filtration filter 2, and the fluid is discharged to the outside of the filtration filter device 1 through the fluid outlet path 32a.

In the present embodiment, the filtration object is, for example, a biological object contained in a liquid. In the present specification, the term "biological object" refers to an object derived from a living thing, such as a cell (eukaryote), a bacterium (eubacterium), a virus, or the like. Examples of a cell (eukaryote) include an ovum, a spermatozoon, an induced pluripotent stem cell (iPS cell), an ES cell, a stem cell, a mesenchymal stem cell, a mononuclear cell, a single cell, a cell cluster, a floating cell, an adhesive cell, a nerve cell, a leucocyte, a lymphocyte, a regenerative medicine cell, an autologous cell, a cancer cell, a circulating tumor cell (CTC), a HL-60, a HELA, and fungi. Examples of bacteria (eubacteria) include gram-positive bacteria, gram-negative bacteria, Escherichia coli, and a tubercle bacillus. Examples of a virus include a DNA virus, an RNA virus, a rotavirus, an (avian) influenza virus, a yellow fever virus, a dengue fever virus, an encephalitis virus, a hemorrhagic fever virus, and an immunodeficiency virus.

Figure 2:
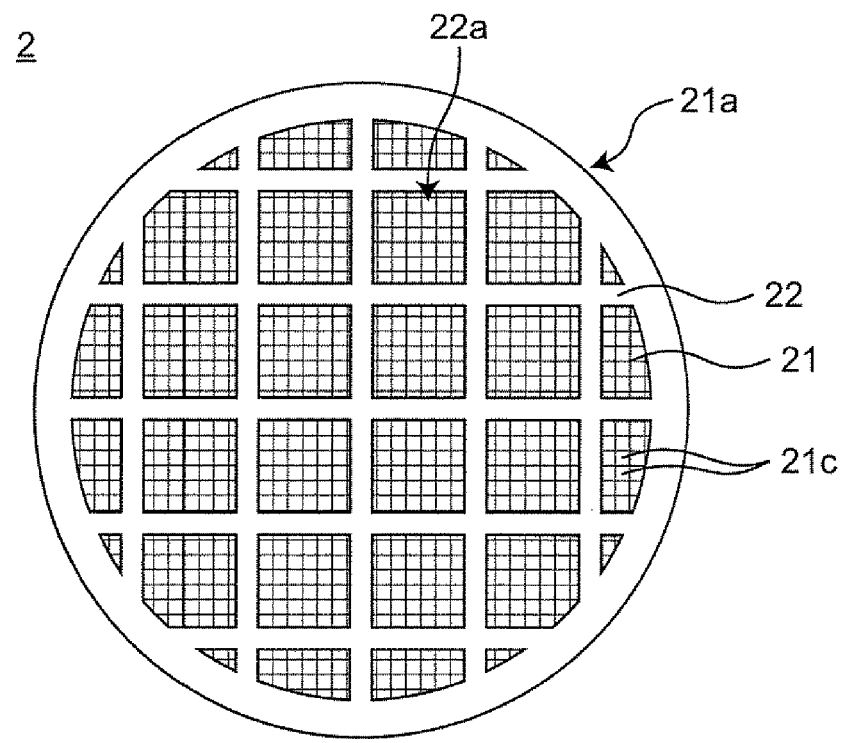
FIG. 2 is a schematic plan view of a filtration filter of the filtration filter device shown in FIG. 1.
Figure 3:
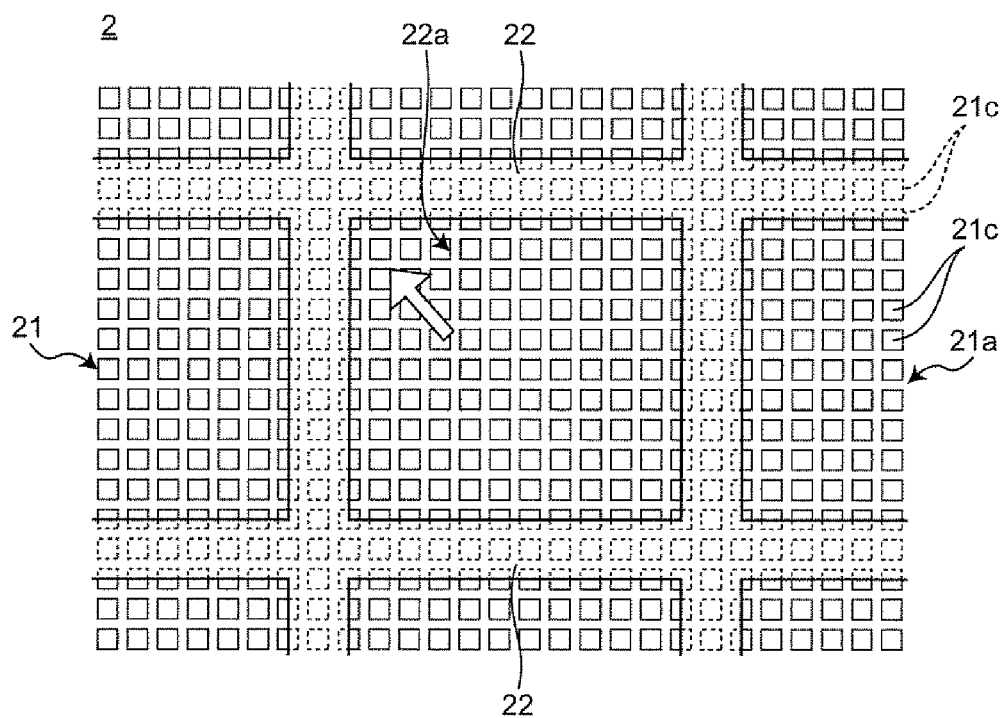
FIG. 3 is an enlarged partial plan view of the filtration filter of FIG. 2.
Figure 4:
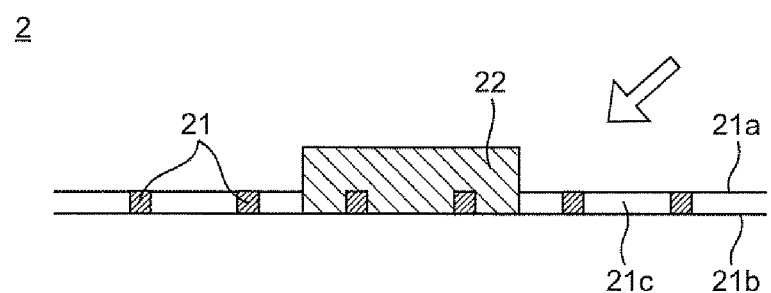
FIG. 4 is an enlarged partial sectional view of the filtration filter of FIG. 2.
Figure 5:
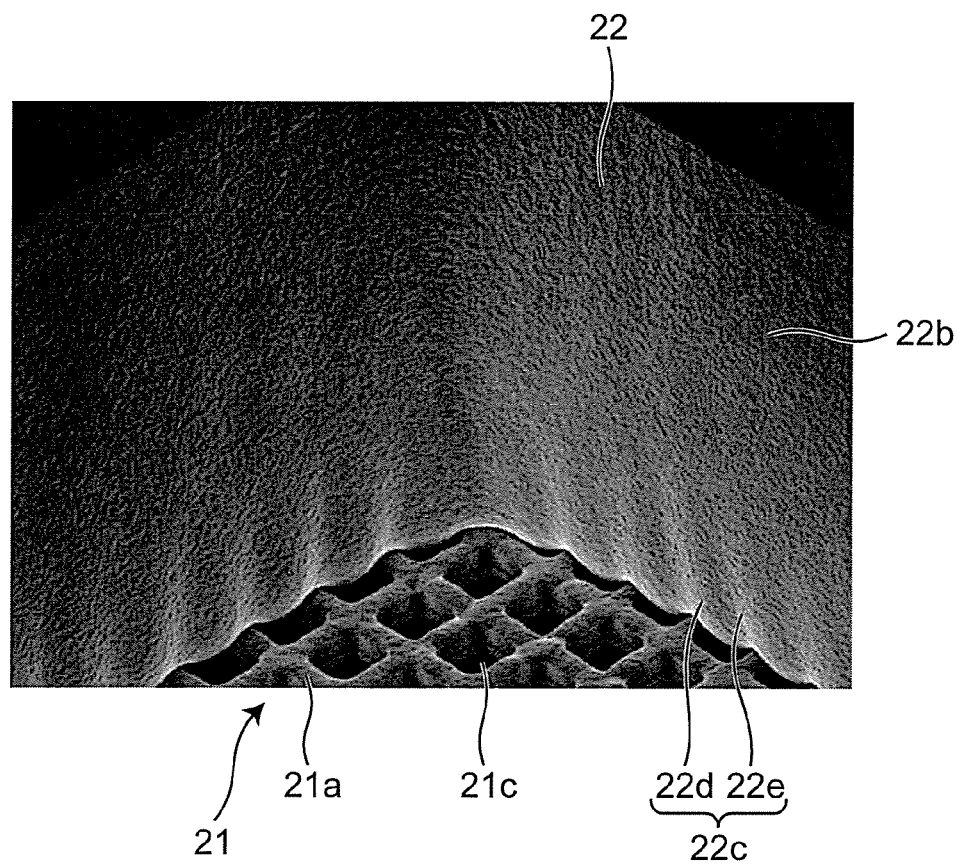
FIG. 5 is a partial perspective view of the filtration filter of FIG. 2 as viewed in the direction of an arrow shown in FIGS. 3 and 4.

Next, the structure of the filtration filter 2 will be described. FIG. 2 is a schematic plan view of the filtration filter 2. FIG. 3 is an enlarged partial plan view of the filtration filter 2. FIG. 4 is an enlarged partial sectional view of the filtration filter 2. FIG. 5 is a partial perspective view of the filtration filter 2 as viewed in the direction of an arrow shown in FIGS. 3 and 4.

As illustrated in FIG. 2, the filtration filter 2 includes a porous metal film 21 which filters out a filtration object contained in a fluid, and a support base member 22, which is disposed on one main surface 21a of the porous metal film 21 and supports the porous metal film 21.

As illustrated in FIG. 4, the porous metal film 21 has the pair of main surfaces 21a and 21b that face each other. The porous metal film 21 has a plurality of through-holes 21c that extend through the main surfaces 21a and 21b. The through-holes 21c serve to separate a biological object from a liquid. The shape and dimensions of each of the through-holes 21c are appropriately set in accordance with the shape and size of the biological object. The through-holes 21c are arranged, for example, at a regular pitch or at a periodic pitch. The shape of each of the through-holes 21c is, for example, square as viewed from the main surface 21a side of the porous metal film 21. In the present embodiment, the through-holes 21c are arranged in a square-grid pattern. The dimensions of each of the through-holes 21c are, for example, a length of 0.1 μm or greater and 500 μm or smaller and a width of 0.1 μm or greater and 500 μm or smaller. The pitch of the through-holes 21c is, for example, greater than each of the through-holes 21c and smaller than or equal to ten times the through-hole 21c, and, preferably, smaller than or equal to three times the through-hole 21c. The opening ratio of the through-holes 21c in the porous metal film 21 is, for example, 10% or higher.

Examples of the material of the porous metal film 21 include gold, silver, copper, platinum, nickel, stainless steel, palladium, titanium, cobalt; an alloy of any of such metals; and an oxide of any of such metals. The dimensions of the porous metal film 21 are, for example, a diameter of 8 mm, and a thickness of 0.1 μm or greater and 100 μm or smaller. The outer shape of the porous metal film 21 is, for example, a circle, an ellipse, or a polygon. In the present embodiment, the outer shape of the porous metal film 21 is a circle. The through-holes 21c may be or may not be formed in an outer peripheral portion of the porous metal film 21.

The support base member 22 reinforces the porous metal film 21. The support base member 22 is affixed to the one main surface 21a of the porous metal film 21 by, for example, using an adhesive. The support base member 22 may, for example, be formed on the one main surface 21a of the porous metal film 21 by using a deposition method. When doing so, the support base member 22 is preferably made from the same material as the porous metal film 21.

The support base member 22 has one or more openings 22a that expos parts of the porous metal film 21. In the present embodiment, a plurality of openings 22a are formed in the support base member 22. The shape and dimensions of each of the openings 22a are appropriately set in accordance with the shape and size of a biological object to be filtered out of the liquid. The openings 22a are arranged, for example, at a regular pitch or at a periodic pitch. The shape of each of the openings 22a is, for example, square as viewed from the main surface 21a side of the porous metal film 21. In the present embodiment, the openings 22a are arranged in a square-grid pattern. Each of the openings 22a has dimensions such that a plurality of the through-holes 21c of the porous metal film 21 can be disposed in the opening 22a. The dimensions are, for example, a length of 260 μm and a width of 260 μm.

Figure 6:
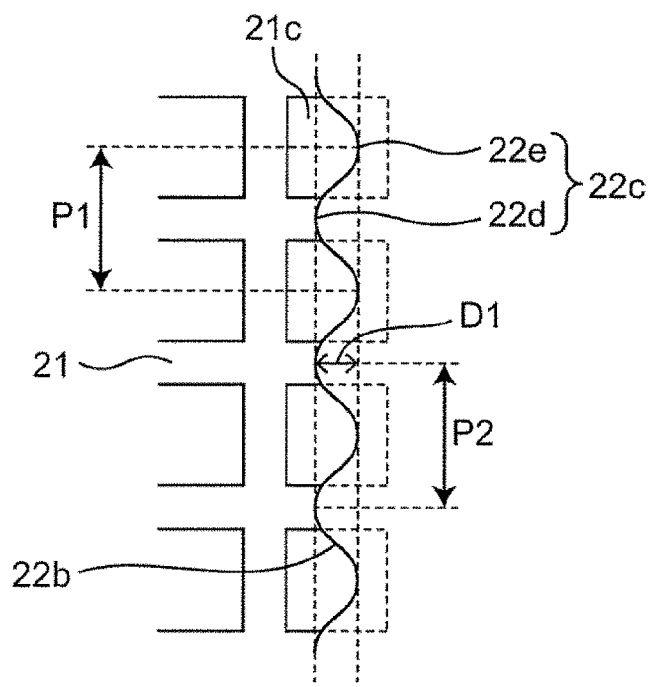
FIG. 6 is a schematic plan view illustrating the positional relationship between through-holes of a porous metal film and ridges and troughs.

As best shown in FIG. 6, an inner peripheral surface 22b of each of the openings 22a of the support base member 22 has a curtain-like undulation 22c in a peripheral direction. In the present embodiment, the undulation 22c has a smooth (sinusoidal) shape. The undulation 22c includes ridges 22d and troughs 22e that are alternately arranged. The ridges 22d and the troughs 22e extend in a direction in which a fluid flows, in order not to impede the flow of the fluid. In other words, the ridges 22d and the troughs 22e extend in a direction that intersects (for example, that is perpendicular to) the main surfaces 21a and 21b of the porous metal film 21. The ridges 22d and the troughs 22e are located in at least portions of the support base member 22 that are in contact with the porous metal film 21 (for example, near the porous metal film 21 to which a filtration object tends to adhere).

In the present embodiment, the ridges 22d are located at positions that correspond to grids of the porous metal film 21 that define the through-holes 21c. The troughs 22e are located at positions corresponding to the through-holes 21c. In other words, as illustrated in FIG. 6, the troughs 22e are located at positions that overlap the through-holes 21c in plan view. The ridges 22d and the troughs 22e are arranged at pitches P1 and P2, respectively, each of which is preferably substantially the same as the pitch of the through-holes 21c. Here, the phrase "the pitch of the through-holes 21c" refers to, for example, the distance between the centroids of any adjacent through-holes 21c. In other words, the ridges 22d and the troughs 22e are arranged at substantially the same pitch as the through-holes 21c. The height (length) D1 from the top of the ridge 22d to the bottom of the trough 22e is preferably smaller than the average particle size of a filtration object.

In the present embodiment, the inner peripheral surface 22b of the opening 22a of the support base member 22 has the undulation 22c in the peripheral direction. With this structure, it is possible to suppress adhesion of a filtration object to the inner peripheral surface 22b and to suppress accumulation of the filtration object in a central part of the exposed portion of the porous metal film 21. Accordingly, filtration efficiency can be improved.

In the present embodiment, a portion of the support base member 22 that is in contact with the porous metal film 21, to which a filtration object tends to adhere, has the undulation 22c. Therefore, it is possible to more effectively suppress adhesion of the filtration object. The entirety of the inner peripheral surface 22b may have the undulation 22c.

In the present embodiment, the undulation 22c includes the ridges 22d and the troughs 22e that are alternately arranged, and the ridges 22d and the troughs 22e extend in the direction in which a fluid flows. With this structure, it is possible to reduce pressure loss due to the ridges 22d and the troughs 22e and to improve filtration efficiency.

In the present embodiment, the ridges 22d and the troughs 22e are arranged at the pitches P1 and P2, each of which is substantially the same as the pitch of the through-holes 21c. The through-holes 21c, for filtering out a filtration object, are each smaller than the average particle size of the filtration object. Therefore, by arranging the ridges 22d and the troughs 22e at the pitches P1 and P2, each of which is substantially the same as the pitch of the through-holes 21c, it is possible to suppress entry of the filtration object into the troughs 22e and to reduce the contact area between the filtration object and the inner peripheral surface 22b. As a result, it is possible to further suppress adhesion of the filtration object to the inner peripheral surface 22b of the opening 22a of the support base member 22.

In the present embodiment, the troughs 22e are formed at positions corresponding to the through-holes 21c of the porous metal film 21. With this structure, compared with a case where the ridges 22d are formed at positions corresponding to the through-holes 21c, it is possible to increase the opening area of the porous metal film 21 and to improve filtration efficiency.

The pitches P1 and P2 of the ridges 22d and the troughs 22e each may be smaller than the average particle size of the filtration object. Thus, it is possible to suppress entry of the filtration object into the troughs 22e and to prevent adhesion of the filtration object to the inner peripheral surface 22b. Preferably, the pitches P1 and P2 of the ridges 22d and the troughs 22e are each smaller than the pitch of the through-holes 21c. Thus, it is possible to further reduce adhesion of the filtration object to the inner peripheral surface 22b.

Next, an example of a method of manufacturing the filtration filter 2 will be described. FIGS. 7A to 7I are sectional views illustrating an example of the method of manufacturing the filtration filter 2.

Figure 7A:
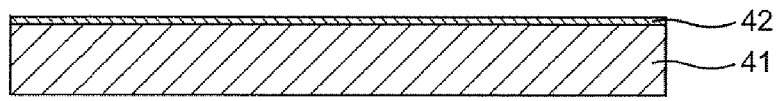
FIG. 7A is a schematic sectional view illustrating a step of a method of manufacturing the filtration filter of FIG. 2.

First, as illustrated in FIG. 7A, a thin copper film 42 is formed on a substrate 41 made of silicon or the like.

Figure 7B:
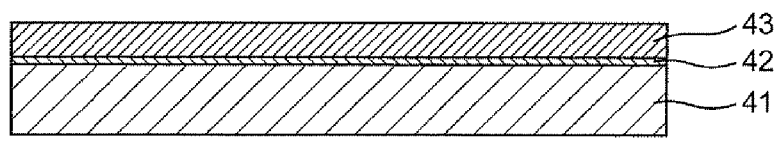
FIG. 7B is a sectional view illustrating a step subsequent to the step shown in FIG. 7A.

Next, as illustrated in FIG. 7B, a first resist film 43 is formed on the thin copper film 42.

Figure 7C:
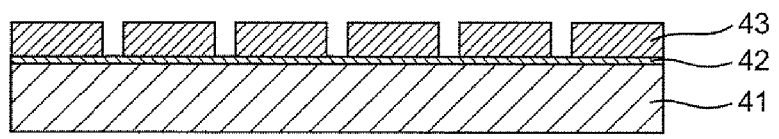
FIG. 7C is a sectional view illustrating a step subsequent to the step shown in FIG. 7B.

Next, as illustrated in FIG. 7C, the first resist film 43 is exposed to light and developed to remove portions of the first resist film 43 corresponding to the porous metal film 21.

Figure 7D:
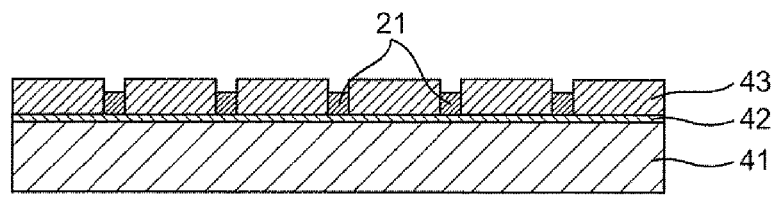
FIG. 7D is a sectional view illustrating a step subsequent to the step shown in FIG. 7C.

Next, as illustrated in FIG. 7D, the porous metal film 21 is formed in the portions from which the first resist film 43 has been removed. The porous metal film 21 can be formed by, for example, electroplating.

Figure 7E:
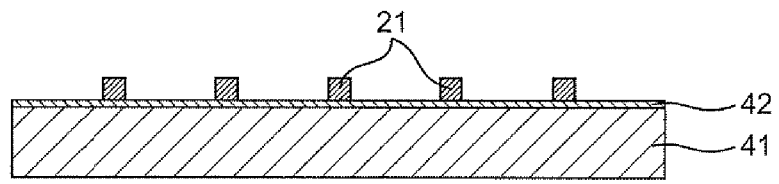
FIG. 7E is a sectional view illustrating a step subsequent to the step shown in FIG. 7D.

Next, as illustrated in FIG. 7E, the first resist film 43 is removed from the thin copper film 42 by dissolving the first resist film 43.

Figure 7F:
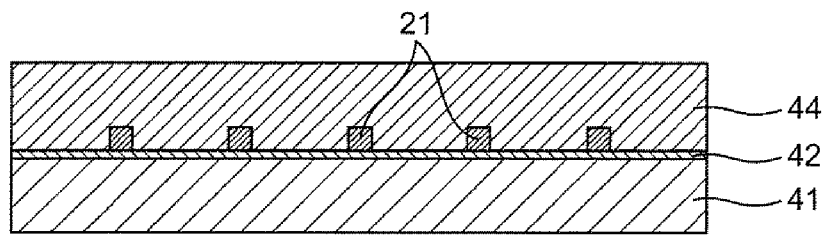
FIG. 7F is a sectional view illustrating a step subsequent to the step shown in FIG. 7E.

Next, as illustrated in FIG. 7F, a second resist film 44 is formed on the thin copper film 42 so as to cover the porous metal film 21.

Figure 7G:
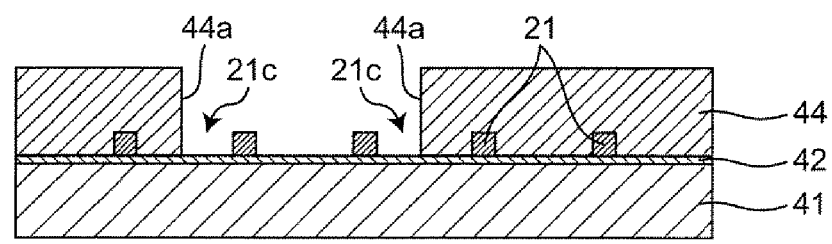
FIG. 7G is a sectional view illustrating a step subsequent to the step shown in FIG. 7F.

Next, as illustrated in FIG. 7G, portions of the second resist film 44 are exposed to light and developed to remove a portion of the second resist film 44 corresponding to the support base member 22.

Figure 7H:
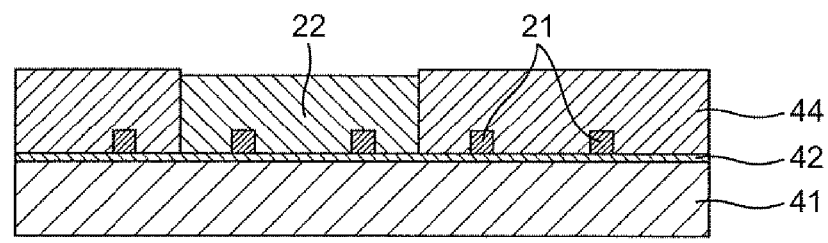
FIG. 7H is a sectional view illustrating a step subsequent to the step shown in FIG. 7G.

Next, as illustrated in FIG. 7H, the support base member 22 is formed in the portion from which the second resist film 44 has been removed. The support base member 22 can be formed by, for example, electroplating.

Figure 7I:
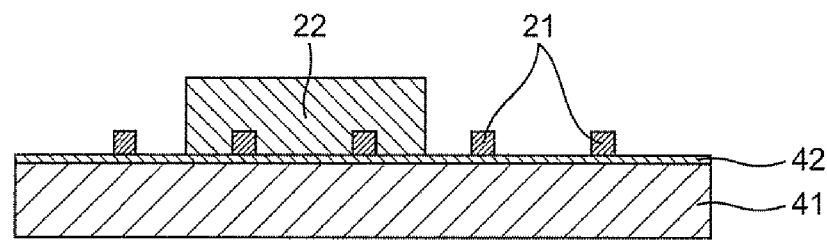
FIG. 7I is a sectional view illustrating a step subsequent to the step shown in FIG. 7H.

Next, as illustrated in FIG. 7I, the second resist film 44 is removed from the thin copper film 42 by dissolving the second resist film 44.

Next, the thin copper film 42 is etched and removed, and the porous metal film 21 and the support base member 22 are peeled off the substrate 41. Thus, the filtration filter 2 illustrated in FIG. 4 is made.

Preferably, as illustrated in FIG. 7G, the second resist film 44 is formed so that an edge portion 44a is located at a central part of the through-hole 21c of the porous metal film 21. In this case, when the second resist film 44 is exposed to light, undulations can be easily formed in a part of the edge portion 44a of the second resist film 44 adjacent to the porous metal film 21 due to interference of light reflected by the porous metal film 21. By forming the support base member 22 along the undulation, it is possible to form the undulation 22c on the inner peripheral surface 22b of the opening 22a of the support base member 22. When forming the support base member 22 by electroplating, it is easy to form the support base member 22 along the undulation of the second resist film 44 by forming a plating layer at a low electric current for a long time.

The present invention is not limited to the above embodiment and may be modified in various ways. For example, in the above embodiment, a filtration object is a biological object contained in a liquid. However, this is not a limitation. The filtration object may be a substance contained in a gas. In other words, the filtration object may be any substance contained in a fluid, and may be, for example, airborne PM 2.5.

In the above embodiment, the porous metal film 21 is used to filter out a biological object from a liquid. However, the invention is not so limited. For example, the porous metal film 21 may be used to concentrate a liquid.

In the above embodiment, the support base member 22 is disposed only on the one main surface 21a of the porous metal film 21, which is on the upstream side in the direction in which a fluid flows. However, the invention is not so limited. The support base member 22 may be disposed on the other main surface 21b of the porous metal film 21, which is on the downstream side in the direction in which a fluid flows. In this case, it is possible to suppress adhesion of an object such as a cell, which is contained in a fluid that has passed through the through-holes 21c, to the inner peripheral surface 22b of the opening 22a. The support base member 22 may also be disposed on both main surfaces 21a and 21b of the porous metal film 21.

In the above embodiment, the pitches P1 and P2 of the ridges 22d and the troughs 22e are each substantially the same as the pitch of the through-holes 21c. However, the invention is not so limited. For example, the pitches P1 and P2 of the ridges 22d and the troughs 22e need not be constant in the peripheral direction. The pitches of the ridges 22d and the troughs 22e may vary in the direction in which the fluid flows.

EXAMPLE

Next, a filtration filter according to Example will be described.

First, by using the manufacturing method described above with reference to FIGS. 7A to 7E, a porous metal film 21 shown in FIG. 7E was formed on a silicon substrate. Nickel was used as the material of the porous metal film 21. A plurality of through-holes 21c were formed in a square-grid pattern in a region within a radius of 3 mm from the center of the porous metal film 21. The length of one side of each of the through-holes 21c was 1.9 μm, and the pitch of the through-holes 21c was 2.6 μm. The thickness of the porous metal film 21 was 1.0 μm.

Next, as illustrated in FIG. 7F, a second resist film 44 (PMER P-CRS4000) was applied to the porous metal film 21 and heated for 5 minutes in air at 130° C.

Next, by using a mask (not shown) having openings corresponding to a support base member 22, the second resist film 44 was exposed to light under the following conditions: numerical aperture (NA) 0.45, focus offset 0 μm, and exposure light intensity 2400 J/m2. Subsequently, the second resist film 44 was heated again for 3 minutes in air at 85° C. and was developed by twice performing immersion of the second resist film 44 in a developer solution (NMD-3) for 1 minute. Thus, as illustrated in FIG. 7G, a portion corresponding to the support base member 22 was removed from the second resist film 44.

Next, asking was performed for 1 minute with an intensity of RF200W, and then the second resist film 44 was immersed for 1 minute in diluted sulfuric acid of 5% for 1 minute. Subsequently, the second resist film 44 was immersed in a nickel plating solution of 55° C. for 17.4 minutes at an electric current of 1.699 A. Thus, as illustrated in FIG. 7H, the support base member 22 was formed in the portion from which the second resist film 44 had been removed.

Next, the second resist film 44 was peeled off by immersing the second resist film 44 in acetone for 15 minutes.

In the support base member 22 that was made as described above, the height of the opening 22a was 35 μm. Undulation 22c was formed on a region of the inner peripheral surface 22b of the opening 22a up to a height of 15 μm from a main surface of the porous metal film 21. The period (pitch) of the undulation 22c was 6.5 μm. Troughs 22e of the undulation 22c were formed at positions corresponding to the through-holes 21c of the porous metal film 21.

Next, the thin copper film 42 was removed by etching, and the porous metal film 21 and the support base member 22 were peeled off the substrate 41. Thus, a filtration filter according to Example was made.

A phosphate buffered saline (PBS) solution containing 1×105 HI-60 cells was filtered through the filtration filter according to this Example. The cells HL-60 had substantially spherical shapes and an average particle size of about 11 μm. Filtration was performed by using a dead-end filtration method using the own weight of the PBS solution. It took about 20 minutes to filter the PBS solution to obtain a filtrate (liquid that has passed through the filtration filter) of 0.5 ml.

Subsequently, the inner peripheral surface 22b of the opening 22a of the support base member 22 was observed by using a microscope, and adhesion of about 13 cells per unit area was observed.

Comparative Example

A filtration filter according to Comparative Example, which had the same structure as the filtration filter according to Example except that the inner peripheral surface 22b of the opening 22a of the support base member 22 was uniform (did not have the undulation 22c), was made.

By using the filtration filter according to Comparative Example, a phosphate buffered saline (PBS) solution containing 1×105 HI-60 cells was filtered under the same conditions as those of Example. It took about 45 minutes to filter the PBS solution to obtain a filtrate (liquid that has passed through the filtration filter) of 0.5 ml.

Subsequently, the inner peripheral surface 22b of the opening 22a of the support base member 22 was observed by using a microscope, and adhesion of about 214 cells per unit area was observed.

Conclusion

Thus, it was confirmed that the filtration filter according to Example has an effect of preventing adhesion of a filtration object.

The present invention is not limited to the embodiment described above in detail with reference to the drawings. It is clear for a person having ordinary skill in the art that the embodiment can be modified or adjusted in various ways, and it is to be understood such modifications and adjustments are within the scope of the present invention described in the claims.

INDUSTRIAL APPLICABILITY

The present invention, which can improve efficiency in filtering a filtration object, is applicable to a filtration filter and a filtration filter device that filter out a filtration object contained in a fluid, such as a biological object or PM 2.5.

REFERENCE SIGNS LIST 1 filtration filter device
2 filtration filter
2a, 2b main surface
3 housing
21 porous metal film
21a, 21b main surface
21c through-hole
22 support base member
22a opening
22b inner peripheral surface
22c undulation
22d ridge
22e trough
31 first housing portion
31a fluid inlet path
32 second housing portion
32a fluid outlet path
41 substrate
42 thin copper film
43 first resist film
44 second resist film
44a edge portion

The invention claimed is:

1. A filtration filter, comprising:
a planar porous metal film for filtering out a filtration object contained in a fluid, the porous metal film lying in a plane and having a plurality of through holes; and
a support base member supporting the porous metal film, the support base member being disposed on at least one main surface of the porous metal film such that each of a plurality of openings formed in the support base member overlay and expose a respective plurality of through holes of the porous metal film, an inner peripheral surface of at least a plurality of the openings, in an area that abuts the porous metal film, being undulated along both a plane parallel to the plane of the porous metal film and a plane perpendicular to the plane of the porous metal film and extending into a respective plurality of the through holes.

2. A filter assembly, comprising:
the filtration filter according to claim 1; and
a housing in which the filtration filter is disposed, the housing having a fluid inlet path that faces one main surface of the filtration filter and a fluid outlet path that faces the other main surface of the filtration filter.

3. A method for forming a filtration filter, comprising:
obtaining a planar porous metal film which lies in a plane and has a plurality of through holes; and
forming a support base member on at least one main surface of the porous metal film such that the support base member supports the porous metal film, the base member having a plurality of opening, a plurality of the openings exposing a respective plurality of the through holes of the porous metal film, an inner peripheral surface of at least a plurality of the openings, in an area that abuts the porous metal film, being undulated along both a plane parallel to the plane of the metal film and a plane perpendicular to the plane of the metal film and extending into a respective plurality of the through holes.

4. The method for forming a filtration filter according to claim 3, wherein undulations of the inner peripheral surface include ridges and troughs that are alternately arranged and extend in a direction perpendicular to a plane in which the porous metal film lies.

5. The method for forming a filtration filter according to claim 4, wherein the pitches of the ridges and the troughs are each smaller than or equal to a pitch of through-holes that are formed in the porous metal film.

6. The method for forming a filtration filter according to claim 4, wherein the troughs are located at positions corresponding to though-holes that are formed in the porous metal film.

7. A method for filtering a filtration object, comprising:
passing a fluid containing a filtration object through the filter of claim 1.

8. The method for filtering a filtration object according to claim 7, wherein:
undulations of the undulated inner peripheral surface have ridges and troughs that are alternately arranged; and
the ridges and the troughs extend in a direction perpendicular to the plane in which the porous metal film lies.

9. The method for filtering a filtration object according to claim 8, wherein pitches of the ridges and the troughs are each smaller than an average particle size of the filtration object.

10. The method for filtering a filtration object according to claim 8, wherein pitches of the ridges and the troughs are each smaller than or equal to a pitch of through-holes that are formed in the porous metal film to filter out the filtration object.

11. The method for filtering a filtration object according to claim 8, wherein the troughs are located at positions corresponding to the through holes that are formed in the porous metal film to filter out the filtration object.

* * * * *